United States Patent
Lin et al.

(10) Patent No.: US 11,805,237 B2
(45) Date of Patent: Oct. 31, 2023

(54) DISPLAY SYSTEM AND METHOD OF DISPLAYING AUTOSTEREOSCOPIC IMAGES

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 2 days.

(21) Appl. No.: 17/237,164

(22) Filed: Apr. 22, 2021

(65) Prior Publication Data

US 2022/0060679 A1 Feb. 24, 2022

(30) Foreign Application Priority Data

Aug. 24, 2020 (TW) ................................. 109128741

(51) Int. Cl.
*H04N 13/302* (2018.01)
*G06T 19/00* (2011.01)
(Continued)

(52) U.S. Cl.
CPC ........... *H04N 13/302* (2018.05); *G06F 9/547* (2013.01); *G06T 1/20* (2013.01); *G06T 19/006* (2013.01);
(Continued)

(58) Field of Classification Search
CPC .... H04L 67/02; H04N 13/194; H04N 13/344; H04N 13/302; G06F 9/547; G06T 1/20; G06T 19/006
See application file for complete search history.

(56) References Cited

U.S. PATENT DOCUMENTS

2002/0163482 A1* 11/2002 Sullivan ............... H04N 13/395
348/E13.058
2007/0165035 A1* 7/2007 Duluk, Jr. ............... G06T 15/20
345/506
(Continued)

FOREIGN PATENT DOCUMENTS

| CN | 110457227 A | 11/2019 |
| TW | 201725424 A | 7/2017 |
| TW | 201905674 A | 2/2019 |

OTHER PUBLICATIONS

Chinese language office action dated Oct. 12, 2021, issued in application No. TW 109128741.

*Primary Examiner* — Neil R Mikeska
(74) *Attorney, Agent, or Firm* — McClure, Qualey & Rodack, LLP

(57) ABSTRACT

A display system is provided. The display system includes a virtual reality display apparatus, an autostereoscopic display apparatus, and a host. In response to a processing unit of the host receiving a specific input signal, the processing unit generates a display-mode control signal, executes an image-conversion software development kit of an OpenVR driver to convert a virtual-reality (VR) stereoscopic image, that is generated by a VR application executed by the host, into an autostereoscopic image, and writes the autostereoscopic image to a second image buffer of the host. In response to the display-mode control signal, the autostereoscopic display apparatus is switched to an autostereoscopic display mode, and a multiplexing circuit of the host selects the autostereoscopic image stored in the second image buffer as an output image signal, and sends the output image signal to the autostereoscopic display apparatus for displaying.

11 Claims, 3 Drawing Sheets

(51) Int. Cl.
*G06T 1/20* (2006.01)
*H04N 13/194* (2018.01)
*G06F 9/54* (2006.01)
*H04L 67/02* (2022.01)
*H04N 13/344* (2018.01)

(52) U.S. Cl.
CPC ........... *H04L 67/02* (2013.01); *H04N 13/194* (2018.05); *H04N 13/344* (2018.05)

(56) References Cited

U.S. PATENT DOCUMENTS

| | | | |
|---|---|---|---|
| 2009/0262125 A1* | 10/2009 | Swaminathan | H04N 13/189 345/581 |
| 2013/0291017 A1* | 10/2013 | Cho | H04N 21/482 725/45 |
| 2017/0351486 A1* | 12/2017 | Won | G06F 3/04817 |
| 2018/0275410 A1* | 9/2018 | Yeoh | G06T 15/00 |
| 2018/0341325 A1* | 11/2018 | Yang | G06F 3/011 |
| 2019/0295304 A1* | 9/2019 | Janardhan | G06T 13/60 |
| 2019/0306421 A1* | 10/2019 | Takeda | H04N 7/185 |
| 2019/0358547 A1* | 11/2019 | Mack | H04N 21/2187 |
| 2020/0211511 A1* | 7/2020 | Schluessler | G09G 3/003 |
| 2020/0320157 A1* | 10/2020 | Lin | G06F 9/44526 |
| 2020/0368616 A1* | 11/2020 | Delamont | A63F 13/213 |
| 2021/0357020 A1* | 11/2021 | Ran | G06T 19/00 |
| 2022/0026711 A1* | 1/2022 | Padula | G06F 3/011 |

\* cited by examiner

DISPLAY SYSTEM AND METHOD OF DISPLAYING AUTOSTEREOSCOPIC IMAGES

CROSS REFERENCE TO RELATED APPLICATIONS

This application claims priority of Taiwan Patent Application No. 109128741, filed on Aug. 24, 2020, the entirety of which is incorporated by reference herein.

BACKGROUND OF THE DISCLOSURE

Field of the Disclosure

The disclosure relates to virtual-reality (VR) display system, and, in particular, to a display system and a method of displaying autostereoscopic images.

Description of the Related Art

VR devices have become more and more popular as technology has advanced. However, if a computer host is used to run 3D games to experience VR content, it often requires the computer host to run a software platform, such as the trademarked SteamVR software platform, and the VR display device (e.g., head-mounted display, HMD) usually needs to support the SteamVR software platform. The stereoscopic image played by this type of VR display device is in the format of a left-eye image plus a right-eye image. However, for autostereoscopic display devices, because of different stereoscopic imaging technologies used, the required stereoscopic images usually need to be in an interface (or woven) format. Compared with the stereoscopic images required by autostereoscopic display devices, the VR technology currently on the market is more mature and the VR content occupies a considerable proportion among stereoscopic content.

Accordingly, how to convert VR content into stereoscopic images required by an autostereoscopic display device without affecting the experience of the VR content has become an important issue.

BRIEF SUMMARY OF THE DISCLOSURE

A detailed description is given in the following embodiments with reference to the accompanying drawings.

In an exemplary embodiment, a display system is provided. The display system includes a virtual-reality (VR) display apparatus, an autostereoscopic display apparatus, and a host. The host includes: a processor, a graphics processing unit (GPU), a first image buffer, a second image buffer, and a multiplexing circuit. The processor executes a VR application, a VR software platform, and an OpenVR™ driver. The multiplexing circuit selects content in the first image buffer or the second image buffer according to a display-mode control signal from the processor. The VR application controls the GPU to simultaneously render a planar image and a VR stereoscopic image of the VR application, and writes the planar image and VR stereoscopic image into the first image buffer and the second image buffer, respectively. In response to the processor receiving a specific input signal, the processor generates the display-mode control signal, executes an image-conversion software development kit (SDK) of the OpenVR driver to convert the VR stereoscopic image to an autostereoscopic image and to write the autostereoscopic image into the second image buffer. The autostereoscopic display apparatus is switched from a planar display mode to an autostereoscopic display mode according to the display-mode control signal, and the multiplexing circuit selects the autostereoscopic image stored in the second image buffer as an output image signal according to the display-mode control signal. The host transmits the output image signal to the autostereoscopic display apparatus for displaying.

In some embodiments, an operating system executed by the host regards the VR application and the OpenVR driver as foreground operations. In some embodiments, when the display-mode control signal is in a low logic state, the autostereoscopic display apparatus is in the planar display mode, and the multiplexing circuit selects the planar image stored in the first image buffer as the output image signal. When the display-mode control signal is in a high logic state, the autostereoscopic display apparatus is in the autostereoscopic display mode, and the multiplexing circuit selects the autostereoscopic image stored in the second image buffer as the output image signal.

In some embodiments, the VR software platform is a SteamVR software platform. The VR stereoscopic image includes a left-eye image and a right-eye image arranged side by side, and the autostereoscopic image includes the left-eye image and the right-eye image in an interlaced format.

In another exemplary embodiment, a display system is provided. The display system includes a virtual-reality (VR) display apparatus, an autostereoscopic display apparatus, and a host. The host includes: a processor, a graphics processing unit (GPU), a first image buffer, a second image buffer, and a multiplexing circuit. The processor executes a WebVR™ extension and a browser. The multiplexing circuit selects content in the first image buffer or the second image buffer according to a display-mode control signal from the processor. when the host is connected to a specific website supporting the WebVR standard and a WebVR function of the specific website is enabled, the WebVR extension generates a planar image and a VR stereoscopic image corresponding to content of the specific website, and writes the planar image and the VR stereoscopic image into the first image buffer and the second image buffer, respectively. In response to the processor receiving a specific input signal, the processor generates the display-mode control signal, executes an image-conversion software development kit (SDK) of the browser to convert the VR stereoscopic image to an autostereoscopic image and to write the autostereoscopic image into the second image buffer. The autostereoscopic display apparatus is switched from a planar display mode to an autostereoscopic display mode according to the display-mode control signal, and the multiplexing circuit selects the autostereoscopic image stored in the second image buffer as an output image signal according to the display-mode control signal. The host transmits the output image signal to the autostereoscopic display apparatus for displaying.

In some embodiments, the operating system executed by the host regards the WebVR extension and the browser as foreground operations. In some embodiments, when the display-mode control signal is in a low logic state, the autostereoscopic display apparatus is in the planar display mode, and the multiplexing circuit selects the planar image stored in the first image buffer as the output image signal. When the display-mode control signal is in a high logic state, the autostereoscopic display apparatus is in the autostereoscopic display mode, and the multiplexing circuit selects the autostereoscopic image stored in the second image buffer as the output image signal.

In some embodiments, the browser is developed based on Google Chromium open-source program. The VR stereoscopic image includes a left-eye image and a right-eye image arranged side by side, and the autostereoscopic image includes the left-eye image and the right-eye image in an interlaced format.

In yet another exemplary embodiment, a method of displaying autostereoscopic images, for use in a display system is provided. The display system comprises a host, a virtual-reality (VR) display apparatus, and an autostereoscopic display apparatus, and the host comprises a processor, a graphics processing unit (GPU), a first image buffer, a second image buffer, and a multiplexing circuit. The method includes the following steps: executing a VR application, a VR software platform, and an OpenVR driver by the host; controlling, by the VR application, the GPU to simultaneously render a planar images and a VR stereoscopic image of the VR application, and to write the planar image and VR stereoscopic image to the first image buffer and the second image buffer, respectively; in response to the processor receiving a specific input signal, generating, by the processor, a display-mode control signal, and executing an image-conversion software development kit (SDK) of the OpenVR driver to convert the VR stereoscopic image into an autostereoscopic image and to write the autostereoscopic image into the second image buffer; switching the autostereoscopic display apparatus from a planar display mode to an autostereoscopic display mode according to the display-mode control signal, and controlling the multiplexing circuit to select the autostereoscopic image stored in the second image buffer as an output image signal according to the display-mode control signal; and transmitting the output image signal to the autostereoscopic display apparatus for displaying.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
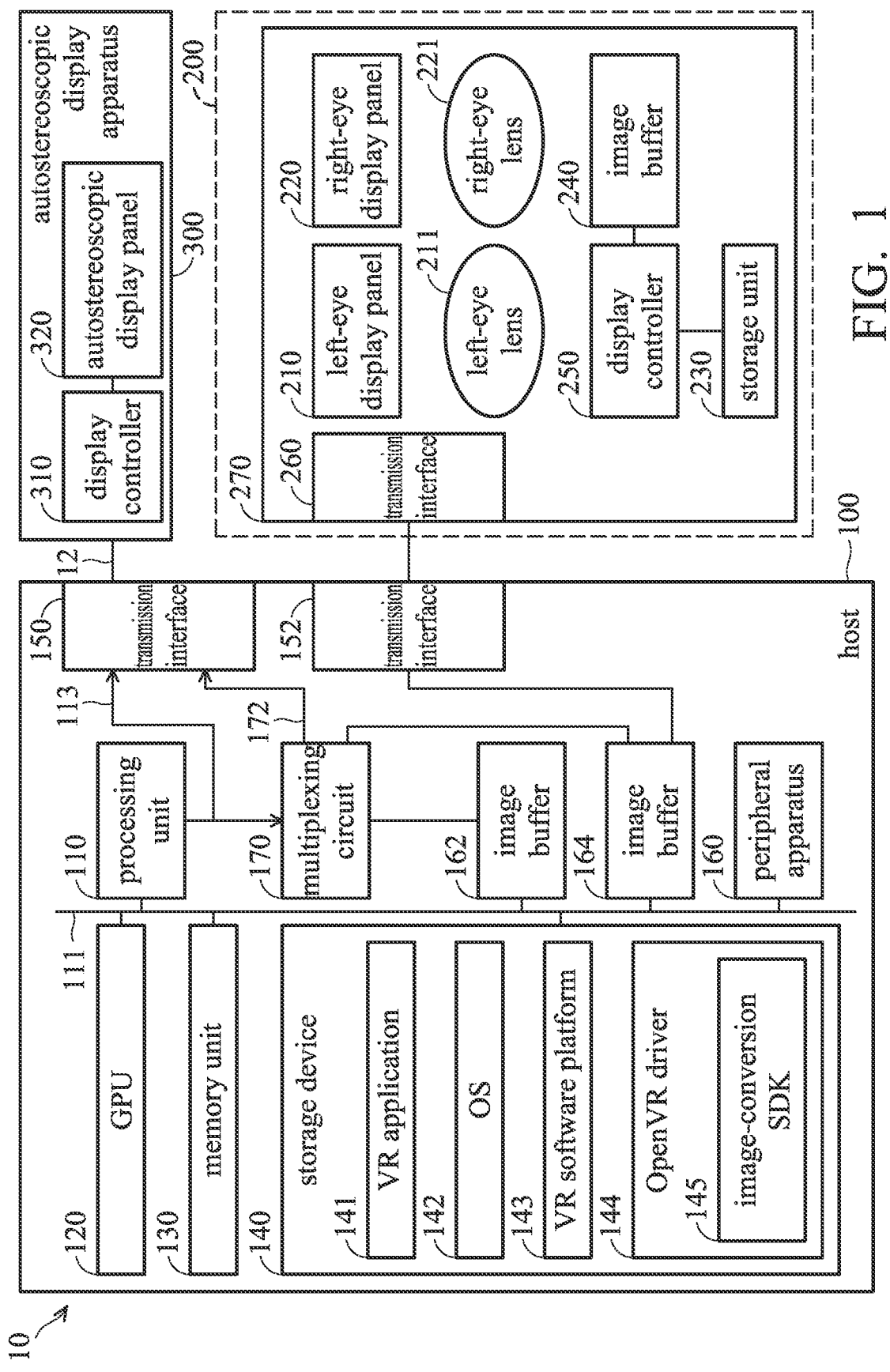
FIG. 1 is a block diagram of a display system in accordance with an embodiment of the invention.

FIG. 1 is a block diagram of a display system in accordance with an embodiment of the invention.

As depicted in FIG. 1, the display system 10 includes a host 100, a VR display apparatus 200, and an autostereoscopic display apparatus 300. In an embodiment, the host 100 is an electronic device such as a personal computer or a server. The VR display apparatus 200, for example, may receive and display stereoscopic images from the host 100, so that the user can view the VR scene. The autostereoscopic display apparatus 300 may determine whether to play a planar 2D image signal or a stereo (3D) image signal according to the display mode control signal from the host.

For example, the autostereoscopic display apparatus 300 may include a display controller 310 and an autostereoscopic display panel. The display controller 310 may switch the display mode of the autostereoscopic display panel 320 according to the display mode control signal from the host 100, such as a planar display mode or an autostereoscopic display mode. The autostereoscopic display panel 320 can be realized by the conventional 3D autostereoscopic technology in the art of the present invention to achieve stereoscopic effects. The aforementioned autostereoscopic technology may include, but is not limited to, parallax barriers, lenticular lenses, directional backlight, etc., and the details will be omitted here.

The host 100 may include a processing unit 110, a graphics processing unit 120, a memory unit 130, a storage device 140, one or more peripheral apparatuses 160, image buffers 162 and 164, and a multiplexing circuit 170. The processing unit 110, graphics processing unit 120, memory unit 130, storage device 140, peripheral apparatus 160, and image buffers 162 and 164 are coupled to each other through the system bus 111. The processing unit 110, for example, may be a central processing unit (CPU) or a general-purpose processor, but the invention is not limited thereto. The graphics processing unit 120 may be a graphics processing unit on a video adaptor or a graphics processing unit integrated into the processing unit 110.

The memory unit 130 may be the system memory of the host 100, and can be implemented by a volatile memory such as a dynamic random access memory (DRAM) or a static random access memory (SRAM), but the invention is not limited thereto. The storage device 140 may be a non-volatile memory such as a hard disk drive, a solid-state disk, a flash memory, or a read-only memory, but the invention is not limited thereto. The image buffers 162 and 164 can also be implemented by volatile memories such as DRAMs or SRAMs, but the invention is not limited thereto. In some embodiments, since the display system 10 supports the SteamVR and OpenVR standards, the image buffers 162 and 164 can be regarded as a main frame buffer and a direct-mode buffer, respectively.

The transmission interfaces 150 and 152 may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), or a combination thereof. The wireless transmission interfaces may include 5th-generation (5G) wireless system, Bluetooth, Wi-Fi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store a VR application 141, an operating system 142 (e.g., Windows, Linux, MacOS, etc.), a VR software platform 143, and an OpenVR driver 144, and the processing unit 110 may load the VR application 141, operating system 142, VR software platform 143 and OpenVR driver 144 to the memory unit 130 for execution.

In an embodiment, the VR application 141, for example, may be a computer game that supports the OpenVR standard. The VR application 141 may communicate with the VR software platform (e.g., the SteamVR software platform) through an OpenVR application-programming interface (API). In the scenario where the VR display apparatus 200 is connected to the host 100, the GPU 120 can perform the graphics processing of the VR application 141 executed by the processing unit 110 to simultaneously generate a first image signal for planar 2D displaying and a second image signal for VR stereoscopic displaying (e.g., a left-eye image and a right-eye image that are arranged side by side), and stores the first image signal and the second image signal respectively in the image buffers 162 and 164. The content in the image buffer 164 can be transmitted to the VR display apparatus 200 for displaying through the transmission interface 152.

The multiplexing circuit 170 may be used to select the first image from the image buffer 162 or the second image signal from the image buffer 164 to obtain an output image signal 172 according to a display-mode control signal 113 from the processing unit 110, and transmit the output image signal 172 to the autostereoscopic display apparatus 300 for displaying through the transmission interface 150. It should be noted that the signal transmitted from the host 100 to the autostereoscopic display apparatus 300 through the transmission interface 150 not only includes the output image signal 172, but also includes the aforementioned display-mode control signal 113.

The VR display apparatus 200, for example, may be a head-mounted display (HMD). The VR display apparatus 200 may include a left-eye display panel 210 and its corresponding left-eye lens 211, a right-eye display panel 220 and its corresponding right-eye lens 221, a storage unit 230, an image buffer 240, a display controller 250, and one or more transmission interfaces 260, and a housing 270. The left-eye display panel 210, left-eye lens 211, right-eye display panel 220, and right-eye lens 221 are arranged in the housing 270 in a predetermined optical arrangement, and the housing 270 may include a strap or other auxiliary device (not shown) for the user to wear on the head to watch the VR screen through the VR display apparatus.

The left-eye display panel 210 and the right-eye display panel 220 may be, for example, a liquid-crystal panel, a light-emitting diode (LED) panel, an organic light-emitting diode (OLED) panel, etc., but the invention is not limited thereto. In some embodiments, the left-eye display panel 210 and the right-eye display panel 220 may be different and separate display panels, or may be implemented by the same display panel, and the left-eye display panel 210 and the right-eye display panel 220 are side by side and parallel with no angle difference between the two. In other embodiments, the left-eye display panel 210 and the right-eye display panel 220 are side by side and not parallel, and there is an angle difference between the two.

The transmission interface 260 corresponds to the transmission interface 152, and may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), or a combination thereof. The wireless transmission interfaces may include 5th-generation (5G) wireless system, Bluetooth, Wi-Fi, near-field communication (NFC) interface, etc., but the invention is not limited thereto.

The display controller 250, for example, may be an application-specific integrated circuit, a system-on-chip, a processor, or a microcontroller, but the invention is not limited thereto. The storage unit 230 may be a non-volatile memory such as a read-only memory (ROM), an erasable programmable read-only memory (EPROM), or an electrically erasable programmable read-only memory (EEPROM). The storage unit 230 may store firmware associated with the VR display apparatus 200. The storage unit 230 may be disposed outside the display controller 250 or be integrated into the display controller 250. The image buffer 240, for example, may be a dynamic random access memory that is used to temporarily store the image signal to be displayed and/or the temporary files generated by the image processing performed by the display controller 250.

In the first scenario, the user may use the VR display apparatus 200 to view stereoscopic images (i.e., including the left-eye images and right-eye images) of the VR scene, and the autostereoscopic display apparatus 300 is in the planar display mode (2D mode) at this time. This configuration is the default configuration of the display system 10. The VR application 141 (e.g., a computer game) executed by the host 100 may control the GPU 120 to render planar images (i.e., one-eye two-dimensional image) and VR stereoscopic images (i.e., left-eye images and right-eye images having parallax), wherein the GPU may write the planar images to the image buffer 162, and write the VR stereoscopic images to the image buffer 164.

Meanwhile, the display-mode control signal 113 generated by the processing unit 110 may be in a low logic state, and thus the multiplexing circuit 170 may select the planar images from the image buffer 162 as the output image signal 172, and output image signal 172 is transmitted to the autostereoscopic 300 for displaying. The display-mode control signal 113, for example, may be a general-purpose input/output (GPIO) signal. In addition, because the image buffer 164 is the direct-mode buffer, the VR stereoscopic images stored in the image buffer 164 can be output to the VR display apparatus 200 for stereoscopic displaying through the transmission interface 152. Accordingly, in the first scenario, the VR display apparatus 200 displays the VR stereoscopic images and the autostereoscopic display apparatus 300 displays the autostereoscopic images simultaneously, and thus the user can wear the VR display apparatus 200 to view the VR stereoscopic (3D) images or directly view the planar (2D) images by the autostereoscopic display apparatus 300.

In the second scenario, the user may use the autostereoscopic display apparatus 300 to view stereoscopic images, which means that the autostereoscopic images are viewed. The autostereoscopic display apparatus 300 is in the autostereoscopic display mode (i.e., 3D mode) at this time, which means that the autostereoscopic display apparatus 300 merely display autostereoscopic images. The VR application 141 (e.g., a computer game) executed by the host 100 may control the GPU 120 to render planar images (i.e., one-eye two-dimensional image) and VR stereoscopic images (i.e., left-eye images and right-eye images having parallax), wherein the GPU may write the planar images to the image buffer 162, and transmit the VR stereoscopic images to the VR software platform 143 performed by the processing unit 110. Meanwhile, the VR software platform 143 may inform the OpenVR driver 144 to control the processing unit 110 and/or the GPU 120 to convert the VR stereoscopic images to autostereoscopic images, and write the autostereoscopic images to the image buffer 164.

Specifically, the OpenVR driver 144 may include an image-conversion software development kit (SDK) 145, wherein the image-conversion SDK 145 may control the processing unit 110 to convert the VR stereoscopic images to autostereoscopic images, and write the autostereoscopic images to the image buffer 164. The autostereoscopic images are basically in an interlaced (or woven) format (e.g., odd-numbered rows are left-eye images, even-numbered rows are right-eye images, or odd-numbered rows are right-eye images, even-numbered rows are left-eye images) that corresponds to the stereoscopic-displaying control mechanism of the autostereoscopic display apparatus 300. Thus, the autostereoscopic display apparatus 300 can display the autostereoscopic images generated by the image-conversion SDK 145 and let the user perceive the autostereoscopic vision.

In the embodiment, the user can send a specific command (e.g., by pressing a specific combination of keys) through the peripheral apparatus 160 (e.g., a keyboard) to control the autostereoscopic display apparatus 300 to switch from the 2D display mode to 3D display mode, or switch from the 3D display mode to the 2D display mode. For example, when the user sends a specific command through the peripheral apparatus 160, the processing unit 110 will toggle display-mode control signal 113 after receiving the specific command, such as switching the display-mode control signal 113 from a low logic state to a high logic state, or switching the display-mode control signal from a high logic state to a low logic state. When the display-mode control signal 113 is in the high logic state, the multiplexing circuit 170 will select the autostereoscopic images from the image buffer 164 as the output image signal 172, and the autostereoscopic display apparatus 300 will be switched to the 3D display mode to display the autostereoscopic images.

It should be noted that in the first scenario, when a conventional host executes a VR application (e.g., a computer game) and displays a stereoscopic image through the VR display apparatus, the operating system will regard the VR application as a foreground operation, and thus the operating system will give most of the system resources of the VR application to perform associated calculations. Accordingly, it will not cause any problem will simultaneously display the planar images on the autostereoscopic display apparatus and display the stereoscopic images on the VR display apparatus. However, if the autostereoscopic display apparatus is used to display the autostereoscopic images under the same hardware configuration, which means that the second scenario is used, and the conventional host converts the VR stereoscopic images into autostereoscopic images, and the autostereoscopic display apparatus displays the autostereoscopic images. At this time, the conventional host encounters a technical problem.

For example, in order to smoothly execute a VR application, the operating system needs to treat the VR application as a foreground operation. If a conventional host want to convert a VR stereoscopic image into an autostereoscopic image, another image-conversion program should be executed to perform the image conversion, and is used to write the generated autostereoscopic images to the image buffer 162. Meanwhile, the operating system will regard the image-conversion program as the foreground operation, and regard the VR application as a background operation. Thus, the VR application cannot obtain sufficient system resources from the operating system to perform associated operations, and the VR stereoscopic images generated by the VR application cannot achieve a sufficient frame rate (e.g., 30 frames per second or more). Accordingly, in the second scenario, if the user wants to use the conventional host to display the autostereoscopic images on the autostereoscopic display apparatus, the user will perceive a delay or jitter on the screen.

In the second scenario, the host 100 of the present invention can integrate the image-conversion SDK 145 into the OpenVR driver 144, and when the processing unit 110 is executing the VR application 141, the OpenVR driver 144 also needs to control the processing unit 110 and/or the GPU 120 to render the VR scene, and thus the operating system 142 will regard the VR application 141 and OpenVR driver 144 as foreground operations and give most of the system resources to the VR application 141 and OpenVR driver 144 for performing associated operations, converting the VR stereoscopic images into autostereoscopic images, and writing the generated autostereoscopic images to the image buffer 164. In addition, in response to the processing unit 110 receiving a specific command, the processing unit 110 can issue a display-mode control command to the multiplexing circuit 170 and the autostereoscopic display apparatus 300, so that the autostereoscopic display apparatus 300 can be switched to the autostereoscopic display mode, and the multiplexing circuit 170 can select the autostereoscopic images stored in the image buffer 164 and output the autostereoscopic images to the autostereoscopic display apparatus 300 for autostereoscopic displaying. Accordingly, the display system 10 of the invention can be interfaced without affecting the original VR content, so that the VR content can be presented on the autostereoscopic display apparatus 300 without delays or jitters.

Figure 2:
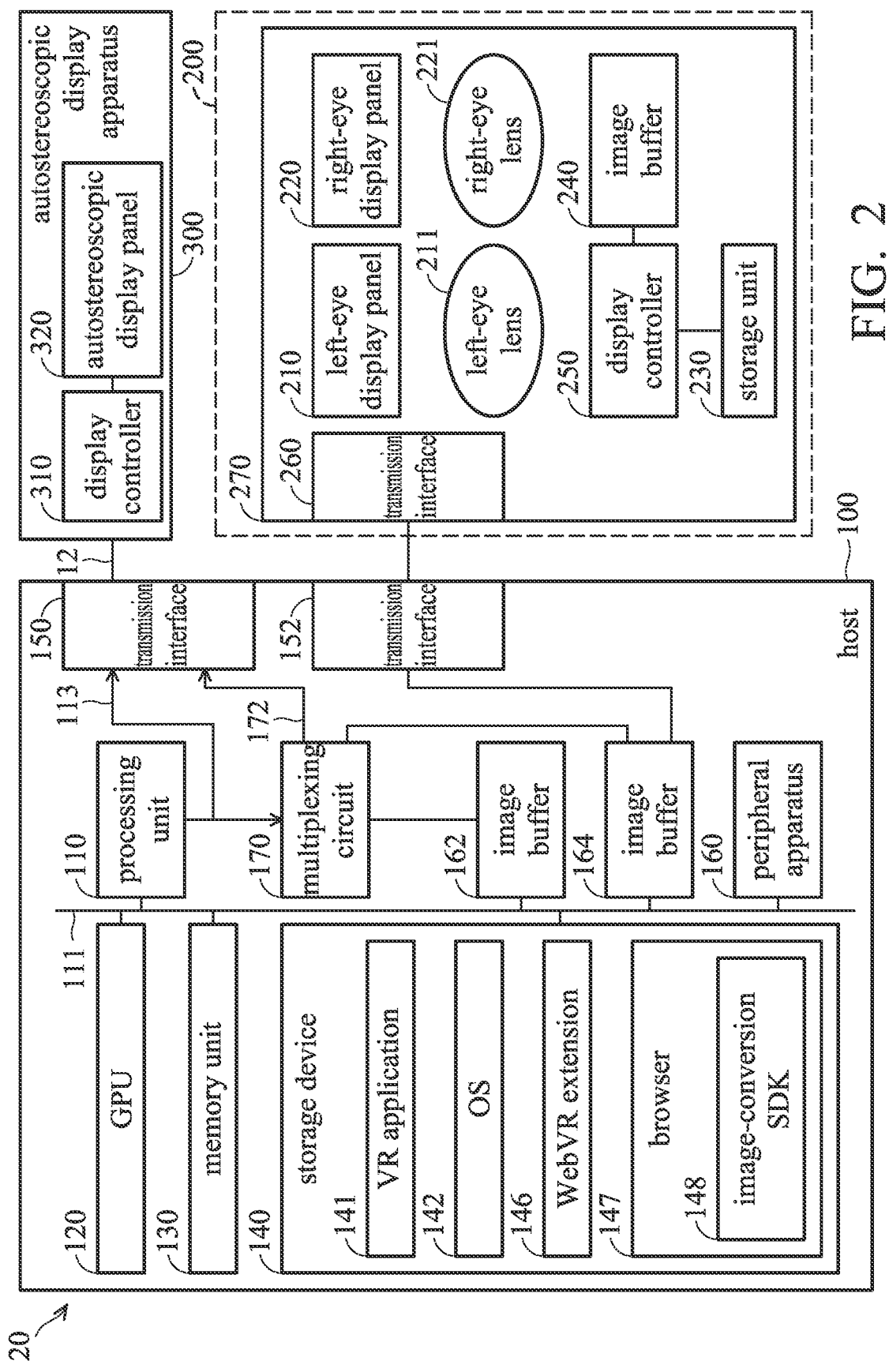
FIG. 2 is a diagram of the display system in accordance with another embodiment of the invention.

FIG. 2 is a diagram of the display system in accordance with another embodiment of the invention.

The display system 20 in FIG. 2 is similar to the display system 10 in FIG. 1, the difference is that the storage device 140 of the display system 20 stores a WebVR extension 146 and a browser 147, and the processing unit 11 may load the VR application 141, operating system 142, WebVR extension 146, and the browser 147 to the memory unit 130 for execution.

The WebVR extension 146 may be an extension of the Chrome browser, and can simulate the content of a web site that supports the WebVR standard as a VR stereoscopic image that is provided to the VR display apparatus 200 (e.g., an HMD) for displaying. The browser 147 is a browser developed based on the Google Chromium open-source program. Accordingly, the WebVR extension 146 can be regarded as an extension of the browser 147 based on Google Chromium.

For example, the user can connect to a specific website on the Internet that supports the WebVR standard through the network interface (not shown) of the host 100, and the WebVR extension 146 converts the content of the specific web site into VR stereoscopic image, and sends the VR stereoscopic image to the browser 147 for displaying.

Similarly, in the first scenario, the user may use the VR display apparatus 200 to view the VR stereoscopic image (i.e., including the left-eye image and right-eye image), and the autostereoscopic display apparatus 300 is in the planar display mode (i.e., 2D mode) at this time, which means that the autostereoscopic display apparatus 300 merely displays planar images at this time. The aforementioned configuration is the default configuration of the display system 20. When the user enables the WebVR function on the specific website, the WebVR extension 146 executed by the host 100 can convert the content of the specific website into VR stereoscopic images, and the browser 147 may write the VR stereoscopic images corresponding to the content of the specific website to the image buffer 164. In addition, the browser 147 can also simultaneously convert the VR stereoscopic images to planar images, and write the planar images to the image buffer 162.

Meanwhile, the display-mode control signal 113 generated by the processing unit 110 is in a low logic state, and thus the multiplexing circuit 170 may select the planar images from the image buffer 162 as the output image signal 172, and the output image signal 172 is transmitted to the autostereoscopic display apparatus 300 for displaying. The display-mode control signal 113, for example, may be a general-purpose input/output (GPIO) signal. In addition, since the image buffer 164 is a direct-mode buffer, the VR stereoscopic images stored in the image buffer 164 can be output to the VR display apparatus 200 for stereoscopic displaying through the transmission interface 152. Accordingly, in the first scenario, the VR display apparatus 200 displays the VR stereoscopic images and the autostereoscopic display apparatus 300 displays the autostereoscopic images simultaneously, and thus the user can wear the VR display apparatus 200 to view the VR stereoscopic (3D) images or directly view the planar (2D) images by the autostereoscopic display apparatus 300.

In the second scenario, the user may use the autostereoscopic display apparatus 300 to view stereoscopic images, which means that the autostereoscopic images are viewed. The autostereoscopic display apparatus 300 is in the autostereoscopic display mode (i.e., 3D mode) at this time, which means that the autostereoscopic display apparatus 300 merely display autostereoscopic images. When the user enables the WebVR function on the specific website, the WebVR extension 146 executed by the host 100 may convert the content of the specific website into VR stereoscopic images, and the browser 147 may write the VR stereoscopic images (e.g., left-eye images and right-eye images having parallax) corresponding to the content of the specific website to the image buffer 164. In addition, the browser 147 can simultaneously convert the VR stereoscopic images into planar images, and write the planar images to the image buffer 162.

Specifically, the browser 147 further includes an image-conversion SDK 148, wherein the image-conversion SDK 148 can control the processing unit 110 to convert the VR stereoscopic images into autostereoscopic images, and write the autostereoscopic images to the image buffer 164. The autostereoscopic images are basically in an interlaced (or woven) format (e.g., odd-numbered rows are left-eye images, even-numbered rows are right-eye images, or odd-numbered rows are right-eye images, even-numbered rows are left-eye images) that corresponds to the stereoscopic-displaying control mechanism of the autostereoscopic display apparatus 300. Thus, the autostereoscopic display apparatus 300 can display the autostereoscopic images generated by the image-conversion SDK 148 and let the user perceive the autostereoscopic vision.

In the embodiment, the user can send a specific command (e.g., by pressing a specific combination of keys) through the peripheral apparatus 160 (e.g., a keyboard) to control the autostereoscopic display apparatus 300 to switch from the 2D display mode to 3D display mode, or switch from the 3D display mode to the 2D display mode. For example, when the user sends a specific command through the peripheral apparatus 160, the processing unit 110 will toggle display-mode control signal 113 after receiving the specific command, such as switching the display-mode control signal 113 from a low logic state to a high logic state, or switching the display-mode control signal from a high logic state to a low logic state. When the display-mode control signal 113 is in the high logic state, the multiplexing circuit 170 will select the autostereoscopic images from the image buffer 164 as the output image signal 172, and the autostereoscopic display apparatus 300 will be switched to the 3D display mode to display the autostereoscopic images.

It should be noted that in the first scenario, when a conventional host executes a browser that supports the WebVR standard, and displays a stereoscopic image through the VR display apparatus, the operating system will regard the VR application as a foreground operation, and thus the operating system will give most of the system resources of the VR application to perform associated calculations. Accordingly, it will not cause any problem will simultaneously display the planar images on the autostereoscopic display apparatus and display the stereoscopic images on the VR display apparatus. However, if the autostereoscopic display apparatus is used to display the autostereoscopic images under the same hardware configuration, which means that the second scenario is used, and the conventional host converts the VR stereoscopic images into autostereoscopic images, and the autostereoscopic display apparatus displays the autostereoscopic images. At this time, the conventional host encounters a technical problem.

For example, in order to smoothly execute a VR application, the operating system needs to treat the VR application as a foreground operation. If a conventional host want to convert a VR stereoscopic image into an autostereoscopic image, another image-conversion program should be executed to perform the image conversion, and is used to write the generated autostereoscopic images to the image buffer 162. Meanwhile, the operating system will regard the image-conversion program as the foreground operation, and regard the VR application as a background operation. Thus, the VR application cannot obtain sufficient system resources from the operating system to perform associated operations, and the VR stereoscopic images generated by the VR application cannot achieve a sufficient frame rate (e.g., 30 frames per second or more). Accordingly, in the second scenario, if the user wants to use the conventional host to display the autostereoscopic images on the autostereoscopic display apparatus, the user will perceive a delay or jitter on the screen.

In the second scenario, the host 100 of the present invention can integrate the image-conversion SDK 148 into the browser 147, and when the user enables the WebVR function on the specific website, the WebVR extension may control the processing unit 110 and/or the GPU 120 to render the VR stereoscopic images corresponding to the content of the specific website, and the browser 147 may simultaneously converts the VR stereoscopic images to planar images and autostereoscopic images, and thus the operating system 142 will regard the WebVR extension 146 and browser 147 as foreground operations and give most of the system resources to the WebVR extension 146 and browser 147 for performing associated operations, converting the VR stereoscopic images into autostereoscopic images, and writing the generated autostereoscopic images to the image buffer 164. In addition, in response to the processing unit 110 receiving a specific command, the processing unit 110 can issue a display-mode control command to the multiplexing circuit 170 and the autostereoscopic display apparatus 300, so that the autostereoscopic display apparatus 300 can be switched to the autostereoscopic display mode, and the multiplexing circuit 170 can select the autostereoscopic images stored in the image buffer 164 and output the autostereoscopic images to the autostereoscopic display apparatus 300 for autostereoscopic displaying. Accordingly, the display system 10 of the invention can be interfaced without affecting the original VR content, so that the VR content can be presented on the autostereoscopic display apparatus 300 without delays or jitters.

Figure 3:
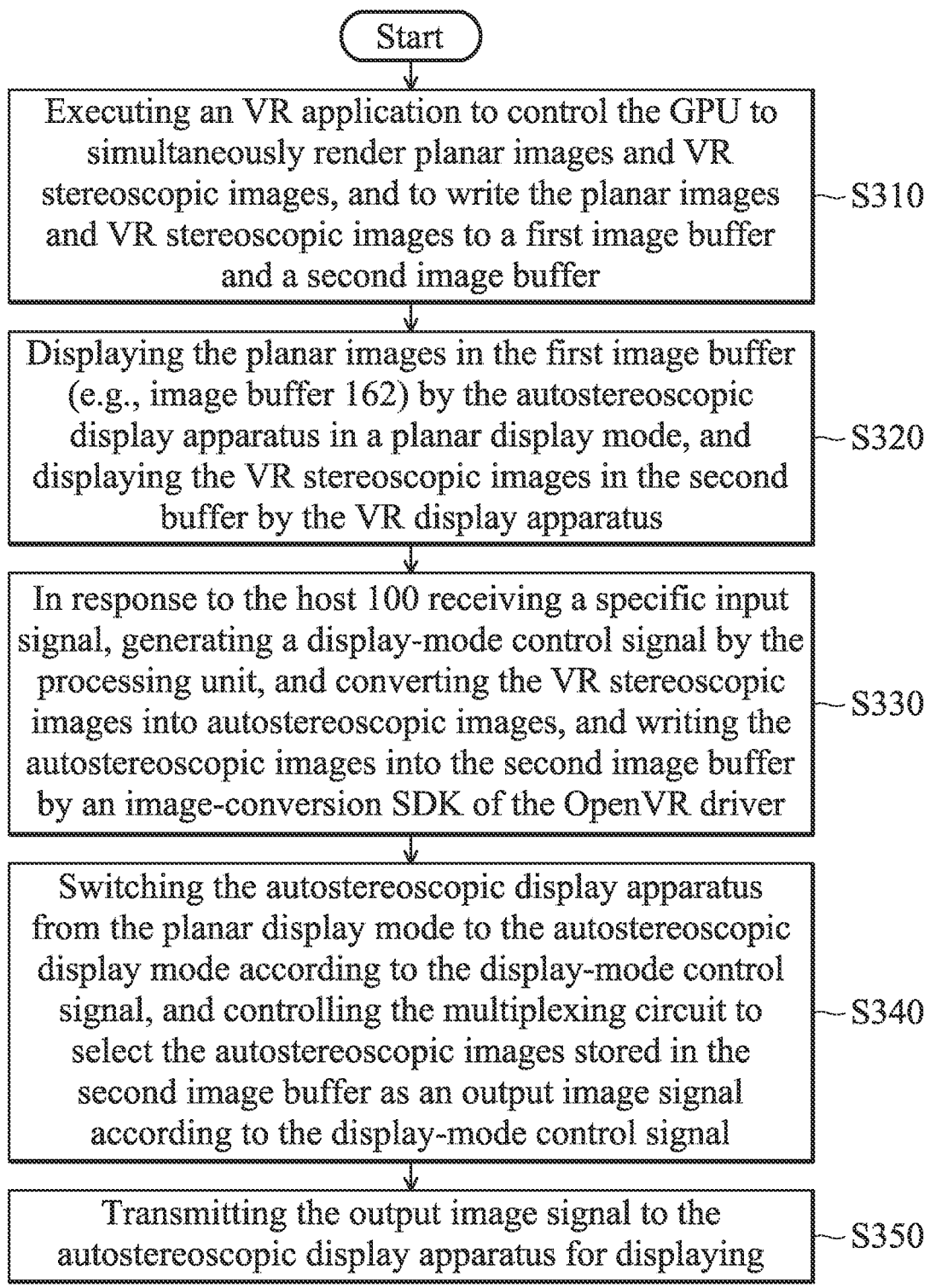
FIG. 3 is a flow chart of a method of displaying autostereoscopic images in accordance with an embodiment of the invention.

FIG. 3 is a flow chart of a method of displaying autostereoscopic images in accordance with an embodiment of the invention.

In step S310, the VR application 141 is executed to control the GPU 120 to simultaneously render planar images and VR stereoscopic images, and to write the planar images and VR stereoscopic images to a first image buffer (e.g., image buffer 162) and a second image buffer (e.g., image buffer 164). The image buffers 162 and 164 can be regarded as the main-frame buffer and the direct-mode buffer, respectively.

In step S320, the planar images in the first image buffer (e.g., image buffer 162) are displayed by the autostereoscopic display apparatus 300 in a planar display mode, and the VR stereoscopic images in the second buffer are displayed by the VR display apparatus 200. In some embodiments, step S320 can be omitted.

In step S330, in response to the host 100 receiving a specific input signal, a display-mode control signal is generated by the processing unit 110, and the VR stereoscopic images are converted into autostereoscopic images and the autostereoscopic images are written into the second image buffer by an image-conversion SDK 145 of the OpenVR driver 144. In this scenario, the operating system 142 will regard the image-conversion as foreground operations, and give most of the system resources to the VR application 141 and OpenVR driver 144 for performing associated calculations, converting the VR stereoscopic images to the autostereoscopic images, and writing the autostereoscopic images to the image buffer 164. The autostereoscopic images are basically in an interlaced (or woven) format (e.g., odd-numbered rows are left-eye images, even-numbered rows are right-eye images, or odd-numbered rows are right-eye images, even-numbered rows are left-eye images) that corresponds to the stereoscopic-displaying control mechanism of the autostereoscopic display apparatus 300. Thus, the autostereoscopic display apparatus 300 can display the autostereoscopic images generated by the image-conversion SDK 145 and let the user perceive the autostereoscopic vision.

In step S340, the autostereoscopic display apparatus is switched from the planar display mode to the autostereoscopic display mode according to the display-mode control signal, the multiplexing circuit 170 is controlled to select the autostereoscopic images stored in the second image buffer as an output image signal according to the display-mode control signal. For example, when the display-mode control signal is in the low logic state, the multiplexing circuit 170 may select the planar images stored in the image buffer 162 as the output image signal, and the autostereoscopic display apparatus 300 is in the planar display mode as this time. When the display-mode control signal is in the high logic state, the multiplexing circuit 170 may select the VR stereoscopic images stored in the image buffer 164 as the output image signal, and the autostereoscopic display apparatus 300 is in the autostereoscopic display mode at this time.

In step S350, the output image signal is transmitted to the autostereoscopic display apparatus for displaying. For example, the format of the output image signal selected by the multiplexing circuit 170 corresponds to the display mode of the autostereoscopic display apparatus 300, such as the planar display mode or the autostereoscopic display mode. In other words, when the autostereoscopic display apparatus 300 is in the planar display mode, the multiplexing circuit 170 may select the planar images stored in the image buffer 162 as the output image signal. When the autostereoscopic display apparatus 300 is in the autostereoscopic display mode, the multiplexing circuit 170 may select the autostereoscopic images stored in the image buffer 164 as the output image signal.

In view of the above, a display system and a method of displaying autostereoscopic images are provided, which can allow the VR display apparatus and the autostereoscopic display apparatus to switch between different stereoscopic display modes without affecting the original VR content to achieve the effect of smoothly displaying stereoscopic images, thereby enhancing the user experience.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display system, comprising:
a virtual-reality (VR) display apparatus;
an autostereoscopic display apparatus; and
a host, comprising:
a processor, configured to execute a VR application, a VR software platform, and an OpenVR™ driver;
a graphics processing unit (GPU);
a first image buffer;
a second image buffer; and
a multiplexing circuit, for selecting content in the first image buffer or the second image buffer according to a display-mode control signal from the processor,
wherein the VR application controls the GPU to simultaneously render a planar image and a VR stereoscopic image of the VR application, writes the planar image into the first image buffer and writes VR stereoscopic image into the second image buffer,
wherein in response to the processor receiving a specific input signal, the processor generates the display-mode control signal, executes an image-conversion software development kit (SDK) of the OpenVR™ driver to convert the VR stereoscopic image to an autostereoscopic image and to write the autostereoscopic image into the second image buffer, wherein the autostereoscopic display apparatus is switched from a planar display mode to an autostereoscopic display mode according to the display-mode control signal, and the multiplexing circuit selects the autostereoscopic image stored in the second image buffer as an output image signal according to the display-mode control signal, wherein the host transmits the output image signal to the autostereoscopic display apparatus for displaying.

2. The display system as claimed in claim 1, wherein an operating system executed by the host regards the VR application and the OpenVR™ driver as foreground operations.

3. The display system as claimed in claim 1, wherein when the display-mode control signal is in a low logic state, the autostereoscopic display apparatus is in the planar display mode, and the multiplexing circuit selects the planar image stored in the first image buffer as the output image signal, wherein when the display-mode control signal is in a high logic state, the autostereoscopic display apparatus is in the autostereoscopic display mode, and the multiplexing circuit selects the autostereoscopic image stored in the second image buffer as the output image signal.

4. The display system as claimed in claim 1, wherein the VR software platform is a SteamVR™ software platform.

5. The display system as claimed in claim 1, wherein the VR stereoscopic image includes a left-eye image and a right-eye image arranged side by side, and the autostereoscopic image includes the left-eye image and the right-eye image in an interlaced format.

6. A display system, comprising:
a virtual-reality (VR) display apparatus;
an autostereoscopic display apparatus; and
a host, comprising:
a processor, configured to execute a WebVR™ extension and a browser;
a graphics processing unit (GPU);
a first image buffer;
a second image buffer; and
a multiplexing circuit, for selecting content in the first image buffer or the second image buffer according to a display-mode control signal from the processor,
wherein when the host is connected to a specific website supporting the WebVR™ standard and a WebVR™ function of the specific website is enabled, the WebVR™ extension generates a planar image and a VR stereoscopic image corresponding to content of the specific website, writes the planar image into the first image buffer and writes the VR stereoscopic image into the second image buffer,
wherein in response to the processor receiving a specific input signal, the processor generates the display-mode control signal, and an image-conversion software development kit (SDK) of the browser converts the VR stereoscopic image to an autostereoscopic image and writes the autostereoscopic image into the second image buffer,
wherein the autostereoscopic display apparatus is switched from a planar display mode to an autostereoscopic display mode according to the display-mode control signal, and the multiplexing circuit selects the autostereoscopic image stored in the second image buffer as an output image signal according to the display-mode control signal, wherein the host transmits the output image signal to the autostereoscopic display apparatus for displaying.

7. The display system as claimed in claim 6, wherein the operating system executed by the host regards the WebVR™ extension and the browser as foreground operations.

8. The display system as claimed in claim 6, wherein when the display-mode control signal is in a low logic state, the autostereoscopic display apparatus is in the planar display mode, and the multiplexing circuit selects the planar image stored in the first image buffer as the output image signal, wherein when the display-mode control signal is in a high logic state, the autostereoscopic display apparatus is in the autostereoscopic display mode, and the multiplexing circuit selects the autostereoscopic image stored in the second image buffer as the output image signal.

9. The display system as claimed in claim 6, wherein the browser is developed based on Google Chromium open-source program.

10. The display system as claimed in claim 6, wherein the VR stereoscopic image includes a left-eye image and a right-eye image arranged side by side, and the autostereoscopic image includes the left-eye image and the right-eye image in an interlaced format.

11. A method of displaying autostereoscopic images, for use in a display system, wherein the display system comprises a host, a virtual-reality (VR) display apparatus, and an autostereoscopic display apparatus, and the host comprises a processor, a graphics processing unit (GPU), a first image buffer, a second image buffer, and a multiplexing circuit, the method comprising:
executing a VR application, a VR software platform, and an OpenVR™ driver by the host;
controlling, by the VR application, the GPU to simultaneously render a planar image and a VR stereoscopic image of the VR application, to write the planar image into the first image buffer and to write VR stereoscopic image into the second image buffer;
in response to the processor receiving a specific input signal, generating, by the processor, a display-mode control signal, and executing an image-conversion software development kit (SDK) of the OpenVR™ driver to convert the VR stereoscopic image to an autostereoscopic image and to write the autostereoscopic image into the second image buffer;
switching the autostereoscopic display apparatus from a planar display mode to an autostereoscopic display mode according to the display-mode control signal, and controlling the multiplexing circuit to select the autostereoscopic image stored in the second image buffer as an output image signal according to the display-mode control signal; and
transmits the output image signal to the autostereoscopic display apparatus for displaying.

* * * * *